United States Patent

Habert et al.

[11] Patent Number: 4,616,963
[45] Date of Patent: Oct. 14, 1986

[54] CUTTING TIP FOR CUTTING-TOOLS

[75] Inventors: Guy Habert, Every, France; Harald Kraft, Uhingen, Fed. Rep. of Germany

[73] Assignee: Feldmuhle Aktiengesellschaft, Düsseldorf, Fed. Rep. of Germany

[21] Appl. No.: 474,573

[22] PCT Filed: Jul. 9, 1982

[86] PCT No.: PCT/DE82/00145
 § 371 Date: Feb. 24, 1983
 § 102(e) Date: Feb. 24, 1983

[87] PCT Pub. No.: WO83/00109
 PCT Pub. Date: Jan. 20, 1983

[30] Foreign Application Priority Data

Jul. 10, 1981 [FR] France .................. 81 13690

[51] Int. Cl.$^4$ .................. B23B 27/22; B26D 1/00
[52] U.S. Cl. ..................... 407/114; 407/116
[58] Field of Search ............... 407/113, 114, 115, 116

[56] References Cited

U.S. PATENT DOCUMENTS

| 3,381,349 | 5/1968 | Newcomer | 407/114 |
| 3,395,434 | 8/1968 | Wirfelt | 407/114 |
| 3,866,282 | 2/1975 | Lundgren | 407/116 |
| 3,875,663 | 4/1975 | Gustafson | 407/114 |
| 3,882,580 | 5/1975 | Lundgren | 407/114 |
| 3,947,937 | 4/1976 | Hertel | 407/114 |
| 3,968,550 | 7/1976 | Gehri | 407/114 |
| 4,124,326 | 11/1978 | Cost | 407/114 |
| 4,203,690 | 5/1980 | Tanaka | 407/119 |
| 4,214,846 | 7/1980 | Kraemer | 407/114 |
| 4,312,250 | 1/1982 | Yankoff | 407/114 |
| 4,318,318 | 3/1982 | Schott | 407/114 |

Primary Examiner—Francis S. Husar
Assistant Examiner—Jerry Kearns
Attorney, Agent, or Firm—Toren, McGeady, Stanger, Goldberg & Kiel

[57] ABSTRACT

Ceramic cutting tips for cutting-tools are provided with an encircling bevel and a shaping stage for the chip. The bevel (3) runs at an angle ($\alpha$) of from 15 to 35 degrees and adjacent thereto there is a channel (5) which has a cross-section in the form of a segment of a circle, the chord (6) of which also runs at an angle of from 15 to 35 degrees with respect to the top surface (4). The length of the chord (6) is between 0.5 and 1.5 mm and the radius (R) of the channel (5) is between 0.6 and 2.5 mm. The hollow channels (5) run out in the corner region of the cutting tip (2) and form a nose (8).

10 Claims, 18 Drawing Figures

CUTTING TIP FOR CUTTING-TOOLS

The invention relates to a cutting tip, especially a ceramic cutting tip for cutting-tools having top and bearing surfaces, which is provided with an encircling bevel and a shaping stage for the chip.

Cutting tips of the type mentioned above are known, for example, from DE-AS 15 52 360 and from DE-OS 22 52 349. The first specification describes a cutting tip having a negative rake angle and the second describes a cutting tip having a positive rake angle. In the case of the cutting tip having a negative rake angle, the bevel is formed by making a chip-breaking groove in the cutting tip, that is to say that the bevel lies in one plane with the top or bearing surface of the cutting tip. Although, therefore, the term bevel is used in DE-AS 15 52 360, the plate is not, in fact, bevelled, rather an edge remains which is retained when the chip-breaking groove is made in the cutting tip. An edge of this type, however, especially if the cutting tip is manufactured from sintered oxide ceramic, is very susceptible to break-outs which result in premature failure of the cutting tip.

The chip-breaking groove has a cross-section which increases continuously from the cutting edge to the middle of the face and is to permit the cutting of chips of different thicknesses. The chip-breaking groove itself, however, lies in the plane of the top or bearing surface, that is to say that at high cutting speeds of more than 250 m/min the chip shaping cannot be influenced or can be influenced only very unsatisfactorily. In the case of the cutting tips represented in DE-OS 22 52 349, the encircling chip-breaking groove forms a positive cutting angle in those cases in which it adjoins the cutting edge directly. If a bevel is provided in front of the groove, a negative rake angle is produced in this case also, the chip-breaking groove running substantially in the plane of the top or bearing surface as it does in the case of DE-AS 15 52 360. Thus, the same disadvantage occurs in the case of the cutting tip described in DE-OS 22 52 349, that is to say that at high cutting speeds the problem of chip shaping is not solved or not in optimum manner, and, in addition, there remains the danger that the edge will break at the cutting edge.

The article "Spanform beim Drehen" (Chip shapes when turning) makes known a classification of the individual chip shapes into disadvantageous, useful and good, the formation of these chips depending on very different factors. These factors are determined, substantially, by the properties of the material to be machined, the conditions of the machining operation including the design of the cutting edge and the cutting material itself. When using the same material to be machined and retaining the same tool, however, the chip changes if the feed rate and/or delivery are altered to such an extent that, possibly, the removal of the chips is no longer ensured and the matching operation therefore has to be broken off or interrupted.

The cutting speeds customary hitherto, such as those that can be achieved with hard metals, are below 250 m/min if uncoated hard metals are used. With the increase in the cutting speed, the problem arises of controlling the shaping of the chip when finishing, since in a unit of time a relatively large volume of chips occurs which must be removed. Disadvantageous chip shapes constitute considerable dangers for the quality of the surface of the workpiece, the tool, the machine-tool and, not least, for the operating staff. The damage results in periods of machine stoppage and the occurrence of rejects and pieces having reduced surface quality.

The problem underlying the present invention is therefore to influence the shaping of chips during finishing in such a manner that a plurality of materials can be machined in the case of a plurality of machining conditions using one tool, without disadvantageous shaping of chips occurring which would require the machining unit to be stopped.

This problem is solved by a cutting tip, especially a ceramic cutting tip for cutting-tools having top and bearing surfaces, which is provided with an encircling bevel and a shaping stage for the chip, which has the characterising feature that the bevel runs at an angle of from 15 to 35 degrees with respect to the top and/or bearing surface and has a width of from 0.05 to 0.4 mm and that adjacent to this bevel there is a channel which has a cross-section in the form of a segment of a circle, the chord of which runs at an angle of from 15 to 35 degrees with respect to the top or bearing surface.

The cutting tip designed in this manner has some fundamental differences with respect to the prior art. Firstly, for example, the channel shaping the chip is not formed in the flat top or bearing surface of the cutting tip, but, since it likewise runs at an angle, forms a continuation of the encircling protecting bevel, wherein it, that is to say its chord, can form an angle diverging at 180 degrees with respect to the protecting bevel.

According to a preferred design of the invention, the length of the chord of the circle segment forming the cross-section of the channel is from 0.5 to 1.5 mm. The channel as such is therefore extraordinarily narrow just as the bevel provided in front of it is very narrow. The channel can therefore be conceived as part of the encirling bevel, that is to say therefore, that the cutting tip is provided with a bevel shaping the chip.

By moving the chip shaping from the top surface of the cutting tip into the bevel, it is possible to achieve a desired chip shaping even at very high cutting speeds which exceed 250 m/min by far and extend into the region of 800 m/min. A further advantage is that useful to good filings are obtained over virtually the whole range of cutting speeds from 250 to 800 m/min, that is to say that it is possible to work with one tool geometry at very different cutting speeds and still obtain filings that can be readily removed. Furthermore, owing to this geometrical shape, useful filings are obtained in the case of very different steels, that is to say the geometrical shape of this cutter can be used for simple construction steel up to alloyed steel.

An advantageous construction of the invention provides that the radius of the channel is from 0.6 to 2.5 mm. This radius obviously depends on the size of the preceding bevel, that is to say that a small channel radius is associated with a narrow bevel and a large channel radius is associated with a relatively broad bevel. There is therefore automatically, on the one hand, a cutting tip which is used for finishing and fine finishing and, on the other hand, a cutting tip which is suitable, in excellent manner, for roughing.

An especially preferred construction of the invention provides that the channel runs out in the corner region to leave a nose. The running out occurs, in that case, in the region of the corner, which is rounded off by a bevel, whereby two things are achieved.

Firstly, owing to the fact that a nose is left, the cutting tip has increased rigidity in the region which is stressed the most, and secondly there is an additional guiding round of the chip and therewith a shaping of the chip which favours the formation of useful or good chips.

To assess the shaping of the chip, a cutting tip according to the invention consisting of sintered oxide ceramic was compared in a series of tests with an assembly-line manufactured cutting tip consisting of oxide ceramic and having a customary encircling bevel. The materials SAE/A ISI 1045, SAE/A ISI 5115 and SAE/A ISI 4137 were selected as material to be machined since this palette covers virtually the whole range of steels customarily worked by cutting. The two cutting tips were square cutting tips. The bevel of the assembly-line cutting tip had a width of 0.3 mm and was arranged at an angle of 30 degrees. The cutting tip according to the invention had a bevel of 0.16 mm which was arranged at an angle of 30 degrees with respect to the cutting face, that is to say the top surface. The adjacent channel had a radius of $0.9 \pm 0.1$ mm and the length of the chord was 0.54 mm. The channels ran out at the corners so that a nose was formed. 45 degrees and 93 degrees were chosen as the entering angle KAPPA. Cutting speeds of 250, 350, 500 and 800 m/min were used. Parallel tests with rhombic and triangular cutting tips gave virtually the same results as were obtained with the square cutting tips.

Figure 16:
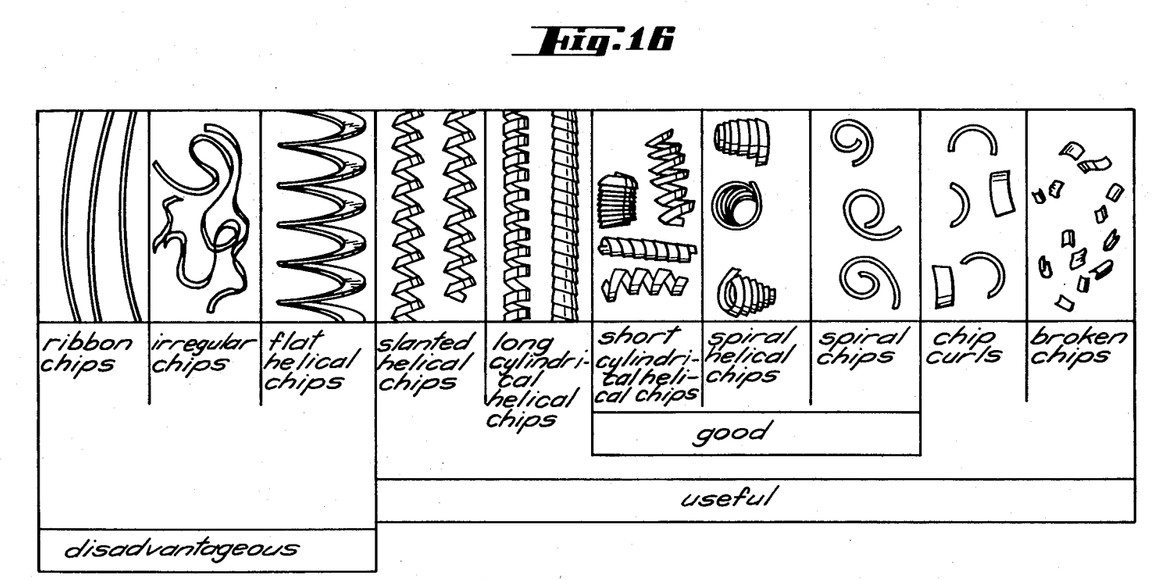
FIG. 16 shows the classification of chip shapes.

Tables 1 to 4 give information about what chips occur under which cutting conditions. The individual chip shapes are numbered 1 to 10 and are shown in FIG. 16 of the drawings. Table 1 gives the values for the cutting tip according to the invention at an entering angle KAPPA of 93 degrees and Table 2 gives the values at an entering angle KAPPA of 45 degrees. In analogous manner, Table 3 shows the results using a standard cutting tip consisting of ceramic and with KAPPA at 93 degrees and Table 4 shows the results with KAPPA at 45 degrees.

The chip shape tests are shown in the graphs of FIG. 11 to FIG. 15 and the following can be concluded:

(a) It can be concluded from sample tests with SAE/A ISI 1045 and SAE/A ISI 5115 that the results of SAE/A ISI 4137 can be considered as representative and can be adopted for comparable types of steel.

(b) In contrast to the standard bevels, the range of action of the chip-shaping bevel is not dependent on the cutting speed (v=200-500 m/min). The chip-shaping bevel loses its effect at speeds in excess of v=500 m/min.

(c) The operation of the chip-shaping bevel is not dependent on the shape of the cutting tip. The decisive factor for its operation is the radius of the corner. Good results were achieved with r=0.4, 0.8 and 1.2 and, indeed, the relatively small corner radii had slight advantages.

With r=1.6, the chip-shaping bevel is no longer effective and can no longer be recommended.

(d) Since a=r, the entering angle has no decisive influence on the chip-shaping behaviour of the chip-shaping bevel.

Comparison of the wear behaviour of the chip-shaping bevel with that of the standard bevel $0.3 \times 30°$ revealed that at 16 min (tool path 8 km) the two bevels have comparable wear mark widths. The chip-shaping behaviour of the chip-shaping bevel remains the same over the whole tool path range.

TABLE I

| Material | | | | Kappa 93° | | | | | | | | | | | |
|---|---|---|---|---|---|---|---|---|---|---|---|---|---|---|---|
| | V-250 | | | | V-350 | | | | V-500 | | | | V-800 | | |
| SAE/AISI 1045 | 0.25 | 6 | 6 | — | 0.25 | 6 | 6 | — | 0.25 | 6 | 6 | — | 0.25 | 3 | 4 | 8 |
| | 0.2 | 6 | 6 | 6 | 0.2 | 6 | 6 | 6 | 0.2 | 6 | 6 | — | 0.2 | 2 | 4 | 8 |
| | 0.15 | 4 | 6 | 6 | 0.15 | 6 | 6 | 6 | 0.15 | 6 | 6 | 6 | 0.15 | 1 | 1 | 9 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |
| SAE/AISI 5115 | 0.25 | 6 | 6 | — | 0.25 | 6 | 6 | — | 0.25 | 6 | 6 | — | 0.25 | 3 | 4 | 8 |
| | 0.2 | 4 | 6 | 6 | 0.2 | 4 | 6 | 7 | 0.2 | 6 | 6 | — | 0.2 | 2 | 4 | 8 |
| | 0.15 | 4 | 4 | 6 | 0.15 | 4 | 6 | 6 | 0.15 | 4 | 6 | 6 | 0.15 | 1 | 1 | 9 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.— |
| SAE/AISI 4137 | 0.25 | 4 | 6 | 6 | 0.25 | 6 | 6 | — | 0.25 | 6 | 6 | — | 0.25 | 3 | 4 | 8 |
| | 0.2 | 4 | 4 | 6 | 0.2 | 4 | 6 | 6 | 0.2 | 4 | 6 | — | 0.2 | 2 | 4 | 8 |
| | 0.15 | 1 | 4 | 6 | 0.15 | 2 | 4 | 4 | 0.15 | 4 | 4 | 8 | 0.15 | 1 | 1 | 9 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |

TABLE II

| Material | | | | Kappa 45° | | | | | | | | | | | |
|---|---|---|---|---|---|---|---|---|---|---|---|---|---|---|---|
| | V-250 | | | | V-350 | | | | V-500 | | | | V-800 | | |
| SAE/AISI 1045 | 0.25 | 8 | 6 | — | 0.25 | 8 | 6 | — | 0.25 | 6 | 6 | — | 0.25 | 6 | 6 | — |
| | 0.2 | 8 | 6 | 8 | 0.2 | 8 | 6 | 8 | 0.2 | 7 | 6 | — | 0.2 | 7 | 6 | — |
| | 0.15 | 8 | 8 | 8 | 0.15 | 8 | 8 | 8 | 0.15 | 8 | 7 | 8 | 0.15 | 8 | 7 | 8 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |
| SAE/AISI 5115 | 0.25 | 8 | 8 | — | 0.25 | 8 | 8 | — | 0.25 | 8 | 6 | — | 0.25 | 8 | 6 | — |
| | 0.2 | 8 | 8 | 8 | 0.2 | 8 | 8 | 8 | 0.2 | 8 | 8 | — | 0.2 | 8 | 8 | — |
| | 0.15 | 8 | 8 | 8 | 0.15 | 8 | 8 | 8 | 0.15 | 8 | 8 | 8 | 0.15 | 8 | 8 | 8 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.— |
| SAE/AISI 4137 | 0.25 | 8 | 8 | — | 0.25 | 8 | 8 | — | 0.25 | 6 | 8 | — | 0.25 | 6 | 8 | — |
| | 0.2 | 8 | 8 | 8 | 0.2 | 8 | 8 | 8 | 0.2 | 6 | 6 | — | 0.2 | 6 | 6 | — |
| | 0.15 | 3 | 6 | 8 | 0.15 | 3 | 6 | 8 | 0.15 | 9 | 6 | 3 | 0.15 | 9 | 6 | 3 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |

TABLE III

| Material | | | | Kappa 93° | | | | | | | | |
|---|---|---|---|---|---|---|---|---|---|---|---|---|
| | V-250 | | | | V-350 | | | V-500 | | | V-800 | | |
| SAE/AISI 1045 | 0.25 | 1 | 1 | 3 | 0.25 | 1 | 1 | 3 | 0.25 | 1 | 1 | 6 | 0.25 | 1 | 1 | 6 |

TABLE III-continued

| Material | | V-250 | | | | Kappa 93° V-350 | | | | V-500 | | | | V-800 | | |
|---|---|---|---|---|---|---|---|---|---|---|---|---|---|---|---|---|
| | 0.2 | 1 | 1 | 1 | 0.2 | 1 | 1 | 1 | 0.2 | 1 | 1 | 2 | 0.2 | 1 | 1 | 2 |
| | 0.15 | 1 | 1 | 1 | 0.15 | 1 | 1 | 1 | 0.15 | 1 | 1 | 1 | 0.15 | 1 | 1 | 1 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |
| SAE/AISI 5115 | 0.25 | 1 | 1 | 3 | 0.25 | | | 3 | 0.25 | 1 | 1 | 6 | 0.25 | 1 | 1 | 6 |
| | 0.2 | 1 | 1 | 1 | 0.2 | | | 1 | 0.2 | 1 | 1 | 2 | 0.2 | 1 | 1 | 2 |
| | 0.15 | 1 | 1 | 1 | 0.15 | | | 1 | 0.15 | 1 | 1 | 1 | 0.15 | 1 | 1 | 1 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.— |
| SAE/AISI 4137 | 0.25 | 1 | 1 | 3 | 0.25 | | | | 0.25 | 1 | 1 | 6 | 0.25 | 1 | 1 | 6 |
| | 0.2 | 1 | 1 | 1 | 0.2 | | | | 0.2 | 1 | 1 | 2 | 0.2 | 1 | 1 | 2 |
| | 0.15 | 1 | 1 | 1 | 0.15 | | | | 0.15 | 1 | 1 | 1 | 0.15 | 1 | 1 | 1 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |

TABLE IV

| Material | | V-250 | | | | Kappa 45° V-350 | | | | V-500 | | | | V-800 | | |
|---|---|---|---|---|---|---|---|---|---|---|---|---|---|---|---|---|
| SAE/AISI 1045 | 0.25 | 1 | 1 | 6 | 0.25 | 1 | 1 | 6 | 0.25 | 1 | 1 | 6 | 0.25 | 1 | 1 | 6 |
| | 0.2 | 1 | 1 | 2 | 0.2 | 1 | 1 | 2 | 0.2 | 1 | 1 | 1 | 0.2 | 1 | 1 | 1 |
| | 0.15 | 1 | 1 | 1 | 0.15 | 1 | 1 | 1 | 0.15 | 1 | 1 | 1 | 0.15 | 1 | 1 | 1 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |
| SAE/AISI 5115 | 0.25 | 1 | 1 | 6 | 0.25 | 1 | 1 | 6 | 0.25 | 1 | 1 | 8 | 0.25 | 1 | 1 | 8 |
| | 0.2 | 1 | 1 | 2 | 0.2 | 1 | 1 | 2 | 0.2 | 1 | 1 | 1 | 0.2 | 1 | 1 | 1 |
| | 0.15 | 1 | 1 | 1 | 0.15 | 1 | 1 | 1 | 0.15 | 1 | 1 | 1 | 0.15 | 1 | 1 | 1 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.— |
| SAE/AISI 4137 | 0.25 | 1 | 1 | 6 | 0.25 | 1 | 1 | 6 | 0.25 | 1 | 1 | 8 | 0.25 | 1 | 1 | 8 |
| | 0.2 | 1 | 1 | 2 | 0.2 | 1 | 1 | 2 | 0.2 | 1 | 1 | 1 | 0.2 | 1 | 1 | 1 |
| | 0.15 | 1 | 1 | 1 | 0.15 | 1 | 1 | 1 | 0.15 | 1 | 1 | 1 | 0.15 | 1 | 1 | 1 |
| | f/a | 0.2 | 0.3 | 0.5 | f/a | 0.2 | 0.3 | 0.5 | f/a | 0.2 | 0.3 | 0.5 | f/a | 0.2 | 0.3 | 0.5 |

The invention is explained below with reference to the drawings.

Figures 1, 1A, 2, 3, 4:
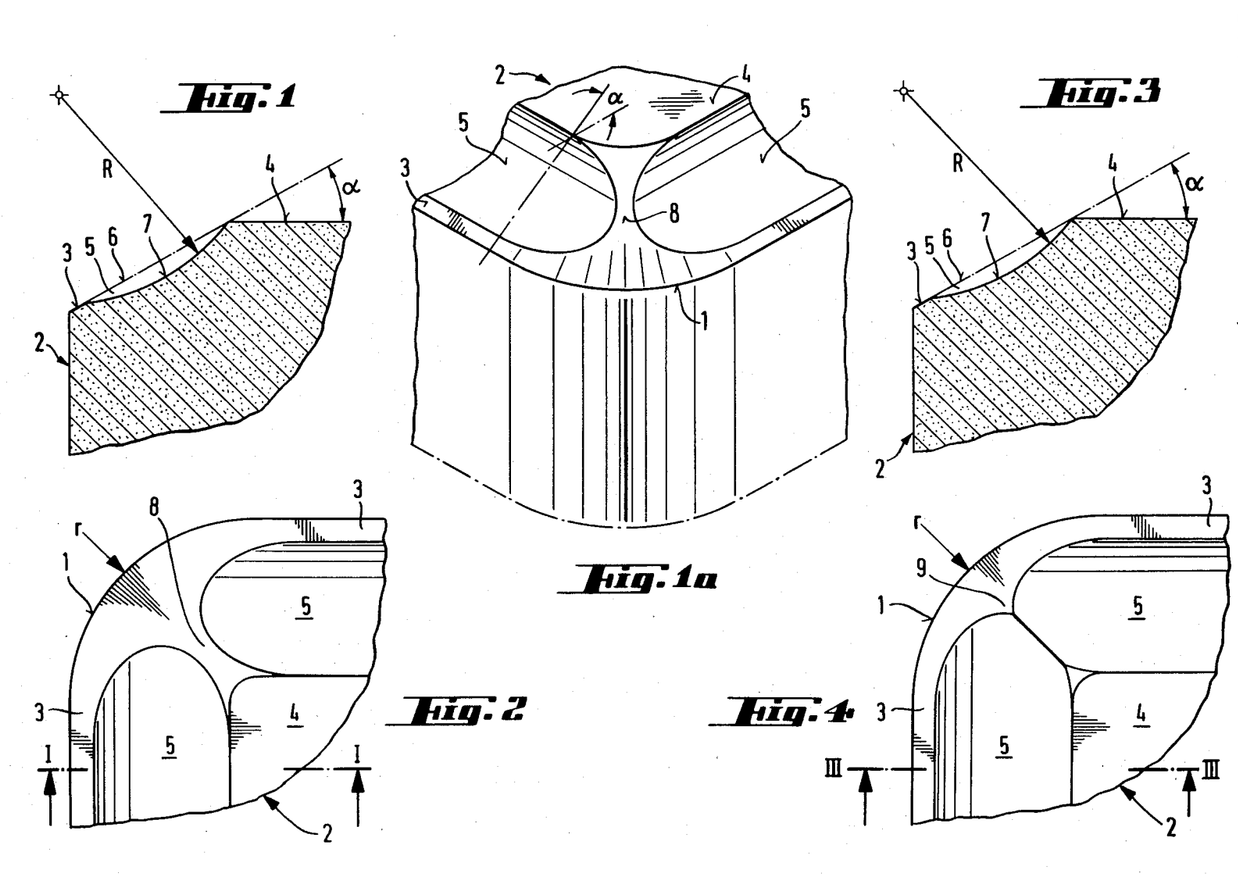
FIGS. 1, 3, 5, 7 and 9 show side views of a cross-section of the corner region of a rectangular cutting tip.
FIG. 1a shows a perspective view of the corner region according to FIG. 1.
FIGS. 2, 4, 6, 8 and 10 each show the associated top view.
Figure 7:
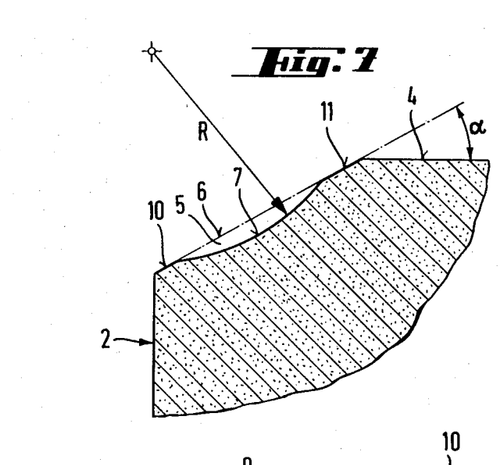

The corner 1 of a rectangular cutting tip 2 is rounded off with a corner radius r, r in FIG. 1 being 1.2 mm. Other radii r are shown in the other Figures. The bevel 3 runs around the whole cutting tip 2 along the top surface 4 and has a width of 0.16 mm. The bevel is placed at an angle α of 30 degrees to the top surface and is separated from the latter by the channel 5. The channel 5 has a radius r of 0.9 mm. The chord 6 of the circle segment 7 which forms the cross-section of the channel 5 has a length of 0.54 mm and, as is shown in FIGS. 1, 3 and 7, runs at the same angle α as does the bevel 3.

Figures 5, 6:
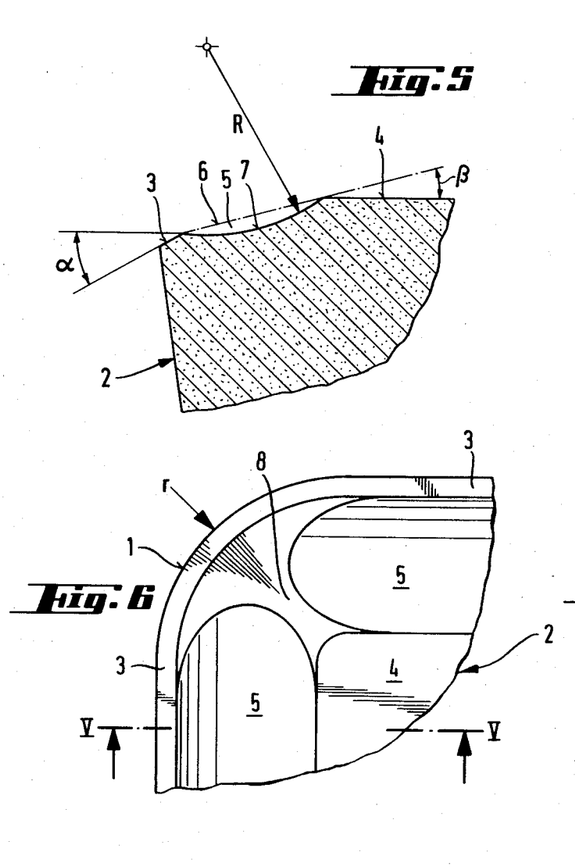

FIGS. 2 and 6 show that the channels 5 run out in the region of the corner 1 and thus form the nose 8. The construction of the nose 8 is determined also by the corner radius r which is between 0.2 and 1.6 mm. It is virtually impossible to influence the chip shape using measurements that are outside this range.

Figure 8:
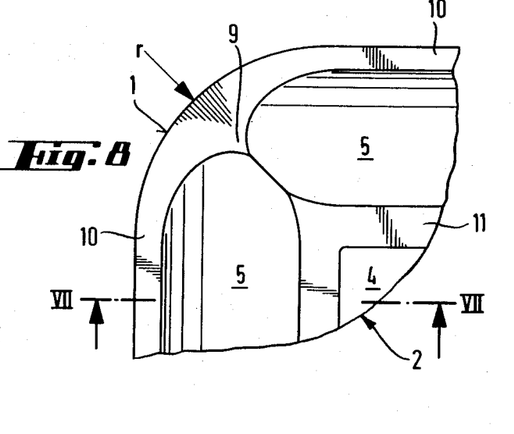

In the case of FIGS. 4 and 8, however, the channels 5 intersect in the corner 1, whereby a nose portion 9 is formed.

FIG. 5 shows that the chord 6 of the circle segment 7 runs at a smaller angle β than does the bevel 3 which runs at an angle α of 30 degrees. In this case, the angle β is 15 degrees.

In FIGS. 7 and 8, the bevel 3 is divided into a lower bevel portion 10 and an upper bevel portion 11, between which the channel 5 is embedded. In that case, the chord 6 and the bevel portions 10 and 11 run at the same angle α of 30 degrees.

Figure 9:
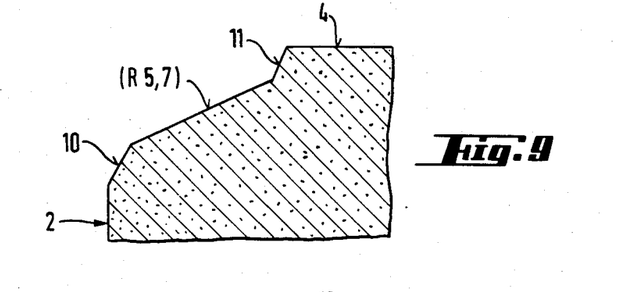
Figure 9A:
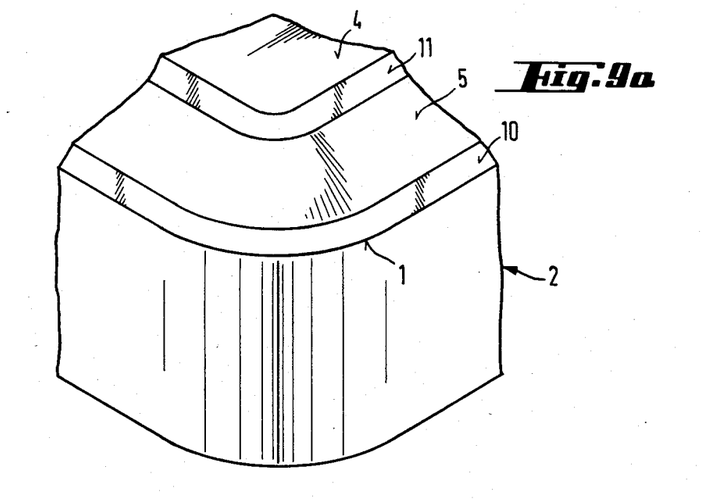
FIG. 9a shows a perspective view of the corner region according to FIG. 9.
Figure 10:
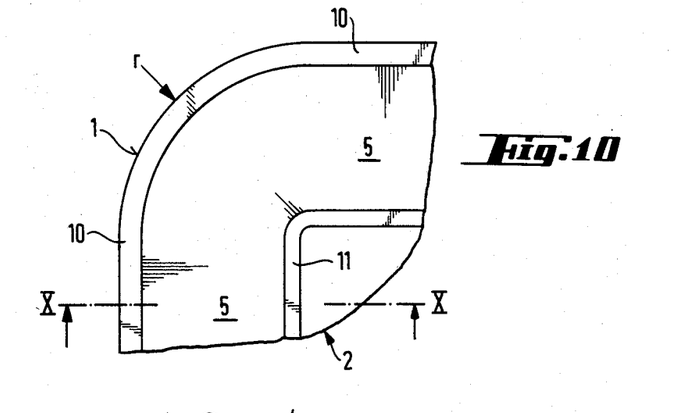

FIGS. 9 and 10 likewise show the bevelling of the cutting tip divided into the lower bevel portion 10 and the upper bevel portion 11. The radius R of the circle segment 7 is, in this case, infinite to that chord and circle segment coincide and form a straight line.

Figure 11:
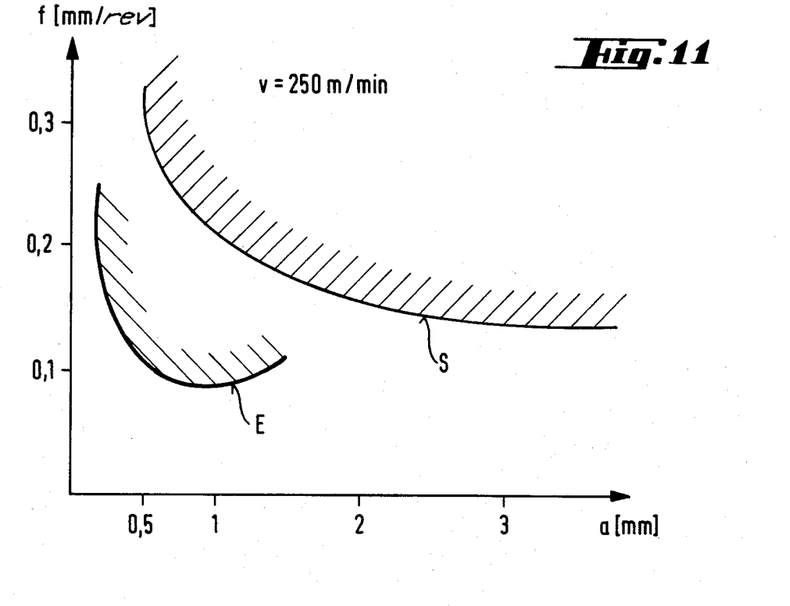
FIGS. 11 to 15 show graphs of chip shapes.
Figure 12:
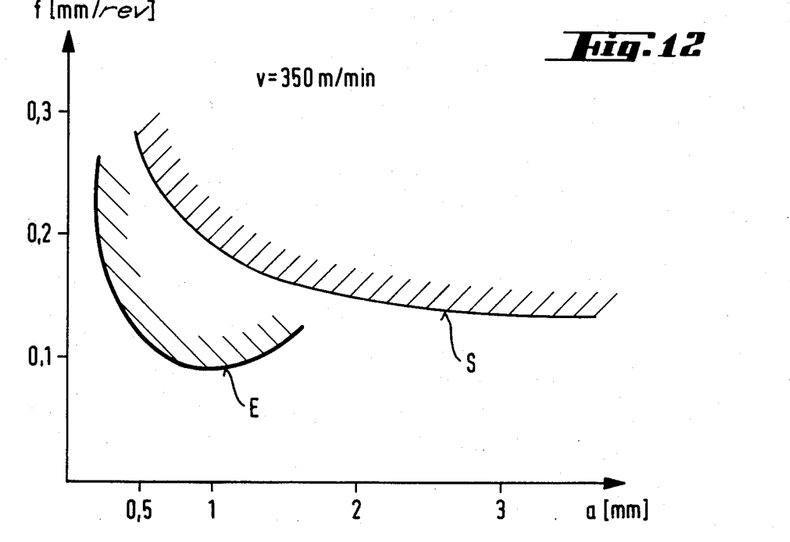
Figure 13:
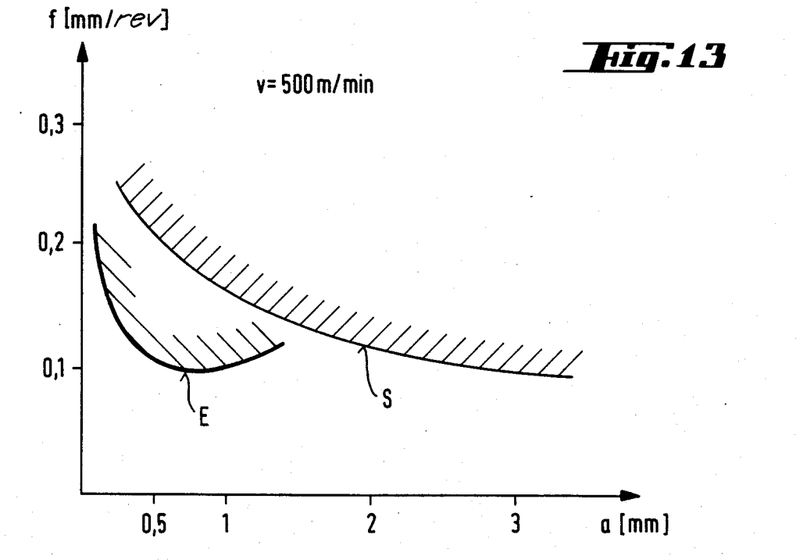
Figure 14:
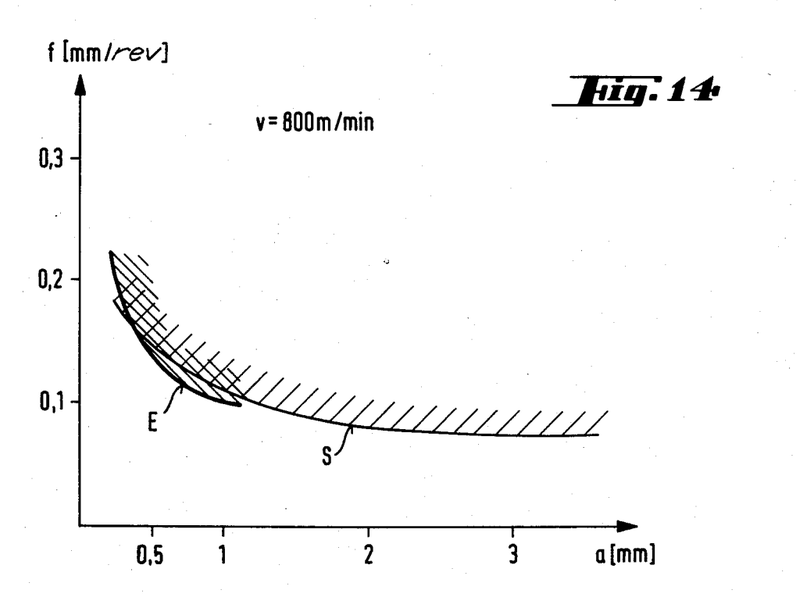
Figure 15:
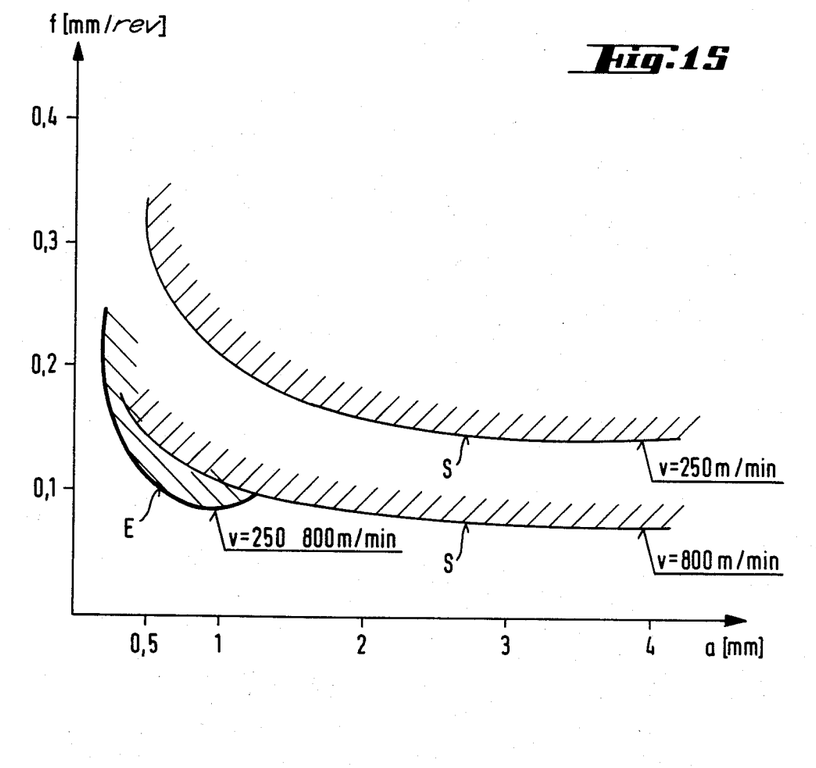

FIGS. 11 to 14 show graphs of chip shapes which were taken on material SAE/A ISI 4137, wherein in FIG. 11 the cutting speed was 250 m/min, in FIG. 12 the cutting speed was 350 m/min, in FIG. 13 the cutting speed was 500 m/min, and in FIG. 14 the cutting speed was 800 m/min. In the Figures, the curve S represents a chip shape graph of a commercial cutting tip having a standard protecting bevel, the curve E represents the graph of the cutting plate according to the invention noted at the same cutting speed. In FIG. 15 these curves are drawn together and it can be seen that in the case of the curves S of the commercial cutting tip having a standard protecting bevel there is considerable deviation between 250 and 800 m/min, that is to say therefore that the chip shapes have a considerable scatter, whereas, in contrast, in the case of the cutting tip according to the invention there is only one coinciding curve E in this range of speeds.

We claim:

1. In a cutting tip for cutting tools having top and bearing surfaces, and side surfaces extending between said top and bearing surfaces, and having an encircling cutting edge defined by a bevel and a shaping stage for the chip, the improvement which comprises the bevel (3) running at an angle (α) of from 15 to ±degrees with respect to the top (4) or bearing surface and having a width of from 0.05 to 0.4 mm, wherein said bevel (3) intersects said said surface and is sloped so that said bevel (3) is inclined upwardly from the point of intersection with said side surface toward said top surface (4) and having next adjacent to this bevel, a channel (5)

which intersects said bevel (3) and has a cross-section in the form of a segment of a circle, the longest chord (6) of which runs at an angle (β) of from 15 to 35 degrees with respect to the top (4) or bearing surface, wherein said chord (6) is sloped so that said chord (6) is inclined upwardly from the point of intersection with said bevel (3) toward said top surface (4).

2. The cutting tip of claim 1 wherein the length of the chord (6) is from 0.5 to 1.5 mm.

3. The cutting tip of claim 1 wherein the radius (R) of the channel (5) is from 0.6 to 2.5 mm.

4. The cutting tip of claim 2 wherein the radius (R) of the channel (5) is from 0.6 to 2.5 mm.

5. The cutting tip of claim 1 wherein the channel (5) runs out in the corner region to leave a nose (8).

6. The cutting tip of claim 2 wherein the channel (5) runs out in the corner region to leave a nose (8).

7. The cutting tip of claim 1 wherein the cutting tip is ceramic.

8. The cutting tip of claim 2 wherein the cutting tip is ceramic.

9. The cutting tip of claim 3 wherein the cutting tip is ceramic.

10. The cutting tip of claim 4 wherein the cutting tip is ceramic.

* * * * *